June 10, 1924.
H. W. MULLENAX
COMBINATION SAW SET AND GAUGE
Filed July 19, 1923
1,497,580
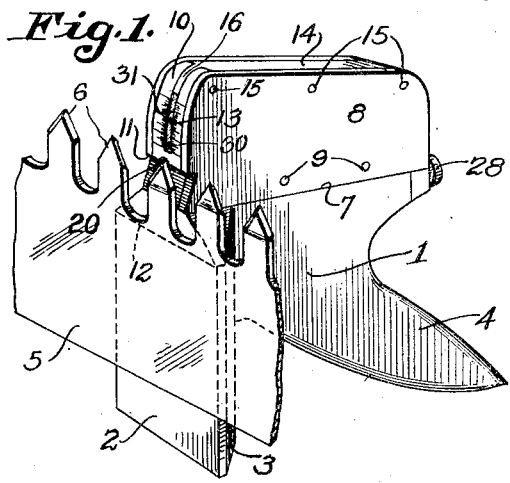
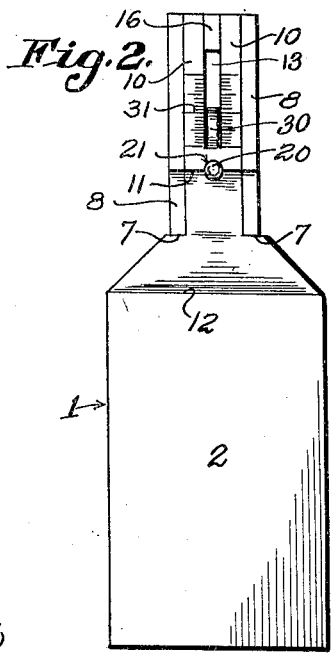
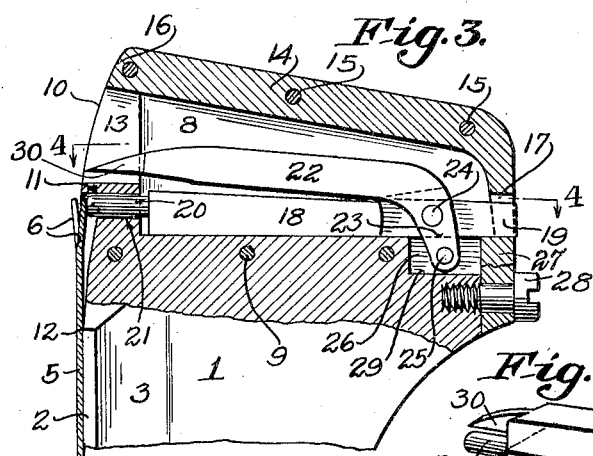
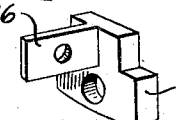
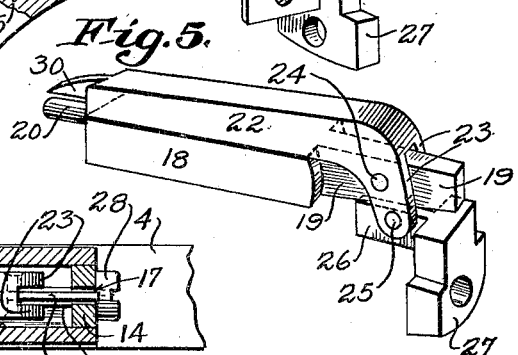
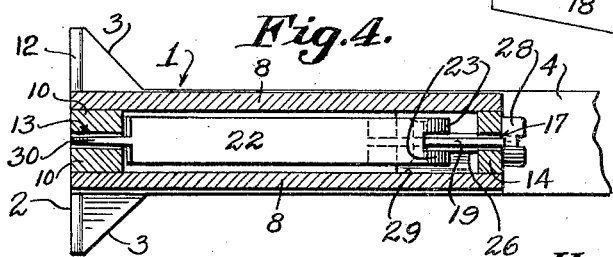
Henry W. Mullenax
INVENTOR
WITNESSES
Louis Goodman
Howard D. Orr.
BY
ATTORNEY Patented June 10, 1924.

1,497,580

UNITED STATES PATENT OFFICE.

HENRY W. MULLENAX, OF MONTEREY, VIRGINIA.

COMBINATION SAW SET AND GAUGE.

Application filed July 19, 1923. Serial No. 652,614.

*To all whom it may concern:*

Be it known that I, HENRY W. MULLENAX, a citizen of the United States, residing at Monterey, in the county of Highland and State of Virginia, have invented a new and useful Improvement in Combination Saw Sets and Gauges, of which the following is a specification.

This invention relates to saw sets and gauges.

The object is to provide a simple, compact and convenient device embodying a saw setting tool and gaging means in combination so arranged as to be readily grasped by one hand of the operator and held thereby in proper relation to the teeth of the saw, while the latter is rigidly held in a saw rack, vise or other means for supporting the same, thus leaving the other hand free to manipulate a hammer for delivering blows to bend the teeth over a specially formed anvil forming part of the device.

Another object is to provide a gaging mechanism located above the said anvil so that by simply lowering the device with relation to the saw, a slight distance, the amount of bend or set given to the tooth by the hammering process may be readily determined, and in the event the tooth has not been bent enough, the device may be slightly elevated again and more hammering applied to the desired extent or, on the other hand, if the said tooth has been bent too far, the device may be further elevated to bring said tooth in contact with a flat, vertical, lower portion of said anvil and the hammer used to put the proper set to the tooth, by reducing the amount of bend.

A full and complete understanding of the invention may be obtained from a consideration of the following detailed description, taken in connection with the accompanying drawing forming a part of this specification, it being understood that while the drawing shows a practical form of the invention, the latter is not confined to strict conformity with the showing thereof, but may be changed or modified, so long as such changes or modifications mark no material departure from the salient features of the invention, as specifically pointed out in the appended claims.

In the drawing, in which similar reference characters designate corresponding parts throughout the several figures:

Figure 1 is a perspective view of the improved saw set and gauge shown applied to a portion of a cross cut saw and in the operation of gaging a tooth thereof.

Figure 2 is a front elevation of the device.

Figure 3 is a vertical, longitudinal sectional view of the same.

Figure 4 is a horizontal sectional view, taken on the line 4—4 of Figure 3.

Figure 5 is a detail perspective view of the gaging member removed from the device.

Figure 6 is a detail perspective view of the attaching plate for the gaging member.

Referring to the drawing it will be seen that the device comprises a body member 1 having its major portion formed solid of some suitable metal capable of withstanding the blows of a hammer used in setting the teeth of saws. The body member 1 is provided with an integral flat face plate forming an anvil 2, the lower end of the latter extending somewhat below the body member and being considerably wider than the width of the said body member, the rear faces of the same, where projecting from the body, being preferably inclined or beveled, as at 3, to give additional strength to the anvil.

A handle 4 of the pistol-grip form, extends from the lower portion of the body member, and is inclined downwardly and rearwardly from the anvil, and is adapted to be grasped by one hand of the operator for properly applying the device to the side of a saw 5, which may be assumed to be rigidly held in a saw rack or other similar means, with the teeth 6 uppermost, as clearly shown in Figure 1 of the drawing. The lower end of the anvil 2 and the lower end of the handle 4 are in the same horizontal plane so that when resting on a table the flat front face of the anvil is arranged vertical.

The upper portion of the body member has its sides reduced to provide seats 7 for the reception of closure plates 8, one plate being secured to each side of the body member, as by rivets or screws 9, and the front wall of the body member is extended upwardly above the top wall thereof, as at 10, to form a front closure for the chamber formed between the side plates 8.

At a point somewhat above the top wall of the body member, the front wall thereof, as well as the plates 8, is provided with a recess or shoulder 11, the said front wall being inclined from said shoulder to the point 12 somewhat below the seats 7, and the inclined surface thus provided serves as a space for the teeth 6, to be bent backwardly the desired degree for properly setting the same for sawing.

The front closure 10 is provided with a vertical slot 13 and a top closure plate 14 is located between the side plates and at the top of the chamber, and is held in position by rivets 15, said plate 14 having a tongue 16 fitting in the upper portion of the slot 13 and receiving one of said rivets 15, while the rear end of the plate 14 is turned downwardly to close the rear end of the chamber and is there provided with a slot 17.

Mounted within the chamber and slidably fitted between the side plates 8 is a sliding bar 18 which rests upon the top wall of the body member, and has its rear end reduced on each side to provide a tongue 19, the outer end of which extends though the slot 17, while the front end of said bar is provided with an integral bolt or push pin 20 which extends forwardly through a bore or passageway 21 formed in the front closure of the chamber and immediately beneath the transverse shoulder 11. The end of the bar 18 normally contacts with the front wall 10 of the body member.

An indicating member 22 normally rests upon the upper face of the sliding bar, and has its rear end directed downwardly and slotted to provide opposite legs 23 which straddle the tongue 19 and are pivotally connected to the same by a rivet 24, while the lower terminals of said legs extend below the tongue and are, in turn, pivotally connected by a rivet 25 to the reduced, inwardly directed arm 26 of an attaching plate 27, which is secured to the rear upper portion of the body member 1 by a screw 28, the rear, outer face of said plate 27 being flush with the downturned rear portion of the top closure plate 14. The inwardly directed arm 26 is located in a slot or recess 29 formed in the body member, at the rear end of the upper wall thereof, and the said recess is of sufficient width to receive the legs 23 and to permit the same to freely rotate about the rivet 25 as an axis.

The front end of the indicating member 22 is provided with a relatively thin pointer or finger 30 which extends through the front slot 13 and normally rests at the bottom thereof by reason of the weight of the member 22, at which time the push pin 20 is extending through the passageway 21 and the outer terminal of said pin is substantially in a vertical line with the surface of the anvil 2 below the aforesaid inclined portion 12.

When the indicating member 22 is at rest upon the sliding bar 18, the shoulder formed at the base of the finger 30 contacts with the inner face of the front wall 10 of the body member, in the same manner as the sliding bar 18, so as to protect the rivets 24 and 25 when the hammer is used in bending the teeth of the saw.

The front face of the front closure 10 is curved, as shown, and at either side of the slot 13 there are graduations 31 or other proper indicia for indicating the amount of set or bend to the teeth of the saw, in a manner to be described.

When the saw 5 is held by a saw rack or other holding means (not shown), the device is applied to one side of the saw with the base of the tooth to be set arranged substantially at the line 12. By striking a blow or blows with a hammer on the outer face of the tooth, the same is bent back into the space provided by the inclined wall below the shoulder 11, the push pin 20 at this time being above the points of the teeth and out of the way of the latter. In order to determine the amount of the bend or set given to the tooth, it is only necessary to lower the device slightly by the hand grasping the handle 4, so that the point of the tooth will engage the projecting end of the push pin 20, and to hold the flat lower portion of the anvil 2 against the vertical face of the saw, when the said pin will be pushed more or less into the passageway 21 and sliding the member 18 along the top wall of the body member and between the side plates 8, thus projecting the rear tongue 19 further through the slot 17 and causing a rocking movement of the indicator member 22, by reason of the pivotal connection 25 of the downwardly extending legs 23. Such rocking movement of the member 22 results in the rising of the pointer or finger 30 in the slot 13, and the amount indicated by the graduations 31, as pointed out by said finger, gives the amount of bending or setting given the tooth. In case the pointer indicates that the tooth has been bent too much, it is only necessary to raise the device until the point of said tooth is near or below the lower end 12 of the inclined, upper portion of the anvil and to direct the blows of the hammer at the base of the tooth which will tend to straighten the latter into alinement with the body of the saw.

From the foregoing it will be seen that a simple and cheaply manufactured device has been provided which may be applied to a saw and held rigidly thereto by one hand, while the other is used in hammering or setting the teeth of the saw against the anvil, and that the teeth may be easily and quickly gaged by simply lowering the device relative to the saw, when the indicator will instantly register the amount of set given to said tooth, all of which may be accomplished without the necessity for laying down the hammer or the setting anvil and picking up a gaging device alternately, as is the case in the ordinary method of setting the teeth of a saw and gaging the same.

What is claimed is:—

1. In a device of the character described, a body member provided with an integral flat face plate forming an anvil, the lower portion of which extends below the body member and is of greater width than said body member, and the upper portion having an inclined surface, and a handle of pistol grip form extending from the lower portion of the body member and inclined downwardly and rearwardly away from the anvil and spaced from the latter and adapted to be grasped by the hand of the operator for applying the device to the side of the saw, the face plate resting flat against the saw, the lower end of the face plate and the lower end of the handle being in the same horizontal plane so that they may rest upon a supporting surface to hold the face plate in an upright position.

2. A combination saw set and gauge comprising a body member provided with a vertically disposed anvil having an inclined surface at the top, and a shoulder above said surface, a horizontal chamber provided on said body member and provided with a front slot located above said shoulder, a bar mounted to slide in the lower portion of the chamber and having a push pin projecting through the front wall thereof below the shoulder, an indicating member pivotally mounted on said sliding bar, said indicating member having at its front end a pointer projecting through the front slot, and graduations formed at the front wall of the chamber adjacent to the slot for coaction with the pointer when the push pin is depressed by the saw teeth.

3. A combination saw set and gauge comprising a body member provided with a vertically disposed anvil having an inclined surface at the top, said body having in its upper end a horizontal chamber with a front slot, a closure for said chamber, a bar mounted to slide in the lower portion of the chamber and having a push pin projecting through the front wall thereof, an indicating member pivotally mounted on said sliding bar and having downwardly projecting legs fulcrumed at the rear end of the chamber and below the sliding bar, said indicating member having at its front end a pointer projecting through the front slot, and graduations formed in the front wall of the chamber adjacent to the slot for coaction with the pointer when the push pin is depressed by the saw teeth.

In testimony, that I claim the foregoing as my own, I have hereto affixed my signature.

HENRY W. MULLENAX.